United States Patent
Kim et al.

(10) Patent No.: US 9,590,705 B2
(45) Date of Patent: Mar. 7, 2017

(54) METHOD AND DEVICE FOR TRANSMITTING AND RECEIVING CHANNEL STATE INFORMATION IN WIRELESS COMMUNICATION SYSTEM

(71) Applicant: LG ELECTRONICS INC., Seoul (KR)

(72) Inventors: Hyungtae Kim, Anyang-si (KR); Eunsun Kim, Anyang-si (KR); Hanjun Park, Anyang-si (KR); Byounghoon Kim, Anyang-si (KR); Jonghyun Park, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/441,737

(22) PCT Filed: Nov. 8, 2013

(86) PCT No.: PCT/KR2013/010118
§ 371 (c)(1),
(2) Date: May 8, 2015

(87) PCT Pub. No.: WO2014/073901
PCT Pub. Date: May 15, 2014

(65) Prior Publication Data
US 2015/0288432 A1    Oct. 8, 2015

Related U.S. Application Data

(60) Provisional application No. 61/724,332, filed on Nov. 9, 212.

(51) Int. Cl.
*H04W 72/06*    (2009.01)
*H04B 7/04*    (2006.01)
(Continued)

(52) U.S. Cl.
CPC ......... *H04B 7/0417* (2013.01); *H04B 7/0413* (2013.01); *H04B 7/0478* (2013.01);
(Continued)

(58) Field of Classification Search
None
See application file for complete search history.

(56) References Cited

U.S. PATENT DOCUMENTS

2011/0249584 A1    10/2011    Barbieri et al.
2013/0084910 A1*   4/2013    Suzuki ............... H04W 24/02
                                                      455/515

(Continued)

FOREIGN PATENT DOCUMENTS

KR        2012-070823 A2    5/2012
KR    10-2012-0083863 A    7/2012

OTHER PUBLICATIONS

Texas Instruments, "System Performance Gains with Rel-10 ICIC and Het-Net Enhancements for Rel-11", R1-112154, 3GPP TSG RAN WG1 Meeting #66, Athens, Greece, Aug. 26, 2011 (http://www.3gpp.org/ftp/TSG_RAN/WG1_RL1/TSGR1_66/Docs/R1-112154.zip).

(Continued)

*Primary Examiner* — Duc Duong
(74) *Attorney, Agent, or Firm* — Dentons US LLP

(57) ABSTRACT

The present invention relates to a wireless communication system. A method by which a user equipment reports a channel state information (CSI) in a wireless communication system, according to one embodiment of the present invention, can comprise the steps of: setting up a first CSI process in which a subframe pattern for a first subframe set, which uses an almost blank subframe (ABS), and a second subframe set, which does not use the ABS, is set; setting up a second CSI process in which the subframe pattern is not set;

(Continued)

setting a second rank indicator (RI) of the second CSI process to be the same as a first RI corresponding to the second subframe set when the second CSI process is established so as to have the same RI as the first CSI process; and transmitting the CSI on the basis of the first CSI process and/or the second CSI process.

14 Claims, 11 Drawing Sheets

(51) Int. Cl.
  *H04B 7/06* (2006.01)
  *H04L 5/00* (2006.01)
  *H04J 11/00* (2006.01)
  *H04W 24/10* (2009.01)
  *H04B 7/02* (2006.01)

(52) U.S. Cl.
  CPC .......... *H04B 7/0486* (2013.01); *H04B 7/063* (2013.01); *H04B 7/068* (2013.01); *H04B 7/0626* (2013.01); *H04B 7/0632* (2013.01); *H04B 7/0691* (2013.01); *H04J 11/005* (2013.01); *H04L 5/0048* (2013.01); *H04L 5/0057* (2013.01); *H04L 5/0073* (2013.01); *H04B 7/024* (2013.01); *H04B 7/0617* (2013.01); *H04W 24/10* (2013.01)

(56) References Cited

U.S. PATENT DOCUMENTS

| | | | | |
|---|---|---|---|---|
| 2013/0194940 A1* | 8/2013 | Li | .................. | H04J 11/0023 370/252 |
| 2013/0196675 A1* | 8/2013 | Xiao | .................. | H04W 72/082 455/452.1 |
| 2013/0294351 A1* | 11/2013 | Kwon | .................. | H04W 24/10 370/328 |
| 2013/0301450 A1* | 11/2013 | Geirhofer | .............. | H04B 7/024 370/252 |
| 2014/0010126 A1* | 1/2014 | Sayana | ................. | H04J 3/1694 370/280 |

OTHER PUBLICATIONS

LG Electronics, "Considerations on CSI Derivation in FeICIC", R1-121431, 3GPP TSG RAN WGI Meeting #68, Jeju, Korea, Mar. 30, 2012 (http:/www.3gpp.org/ftp/TSG_RAN/WG1_RL1/TSGR1_68b/Docs/R1-121431.zip) See sections2-3.

* cited by examiner

FIG. 5
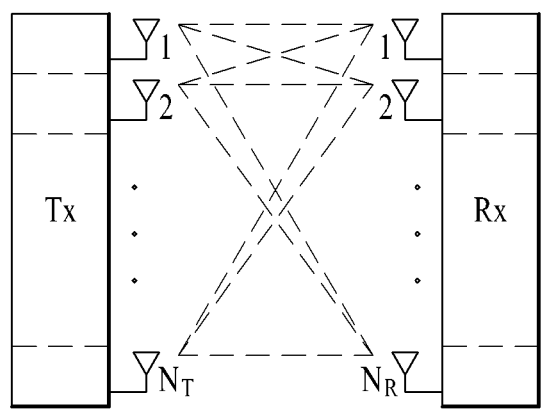
(a)
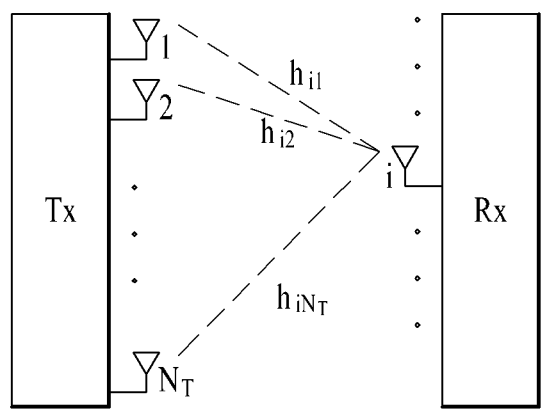
(b)

FIG. 10
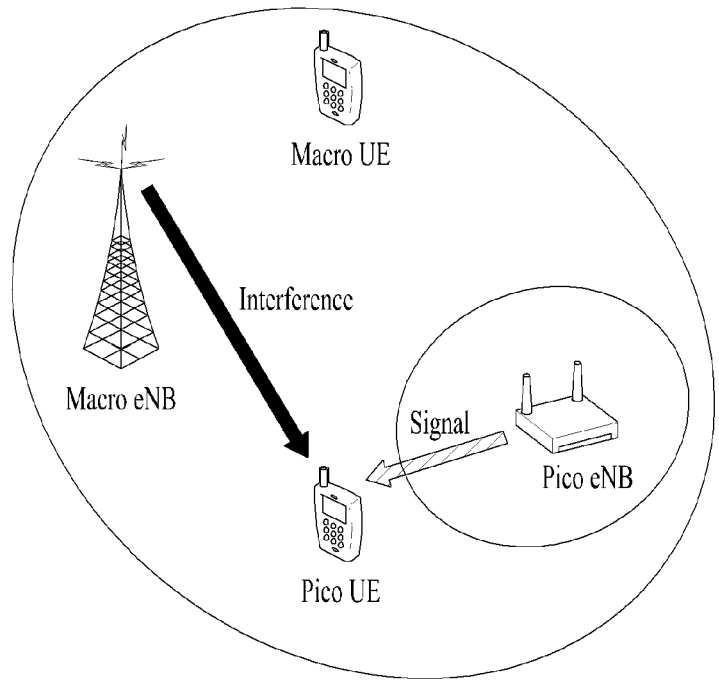
(a)
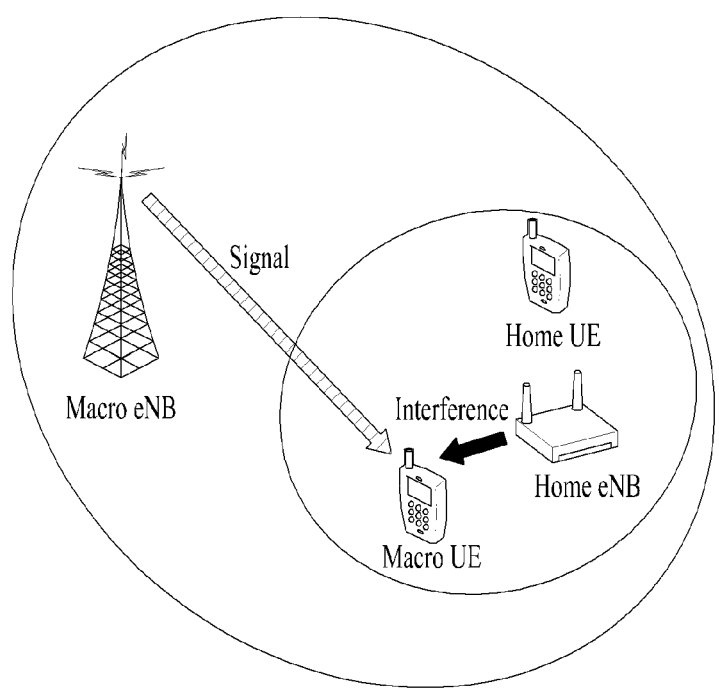
(b)

METHOD AND DEVICE FOR TRANSMITTING AND RECEIVING CHANNEL STATE INFORMATION IN WIRELESS COMMUNICATION SYSTEM

This application is a National Stage Entry of International Application No. PCT/KR2013/010118, filed Nov. 8, 2013, and claims the priority to and benefit of U.S. Provisional Nos. 61/724,332 filed on Nov. 9, 2012, each of which is hereby incorporated by reference in its entirety for all purposes as if fully set forth herein.

TECHNICAL FIELD

The present invention relates to a wireless communication system, and more particularly, to a method and device for reporting channel state information when a first channel state information (CSI) process, in which subframe patterns for a first subframe set based on an almost blank subframe (ABS) and a second subframe set which is not based on the ABS are configured, is configured, a second CSI process, in which subframe patterns are not configured is configured, and the second CSI process is configured to have the same rank indicator (RI) as that of the first CSI process.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE

Technical Problem

Based on the aforementioned discussion, an object of the present invention is to provide a method and device for transmitting and receiving channel state information in a wireless communication system.

The technical objects that can be achieved through the present invention are not limited to what has been particularly described hereinabove and other technical objects not described herein will be more clearly understood by persons skilled in the art from the following detailed description.

Technical Solution

To solve the aforementioned problem, according to one embodiment of the present invention, a method for enabling a user equipment to report channel state information (CSI) in a wireless communication system comprises the steps of configuring a first CSI process, in which subframe patterns for a first subframe set based on an almost blank subframe (ABS) and a second subframe set which is not based on the ABS are configured; configuring a second CSI process in which the subframe patterns are not configured; configuring a second rank indicator (RI) of the second CSI process to be the same as a first RI corresponding to the second subframe set when the second CSI process is configured to have the same RI as that of the first CSI process; and transmitting the CSI on the basis of at least one of the first CSI process and the second CSI process.

If the first CSI process and the second CSI process are configured to periodically report the CSI, the second RI may be set to the same value as that of the first RI which is reported most recently before the second RI is reported.

A second precoding matrix indicator (PMI) of the second CSI process may be set to the same value as that of a first PMI which is reported most recently before the second PMI is reported.

A second channel quality indicator (CQI) of the second CSI process may be set to the same value as that of a first CQI which is reported most recently before the second CQI is reported.

If the first CSI process and the second CSI process are configured to aperiodically report the CSI, and if the first CSI process and the second CSI process are requested to be CSI reported at the same time, the second RI may be set to the same value as that of the first RI corresponding to the second subframe set.

The second PMI and second CQI of the second CSI process may be set to the same values as those of the first CSI process, which are reported at the same time.

According to another embodiment of the present invention, a method for enabling a user equipment to report channel state information (CSI) in a wireless communication system comprises the steps of configuring a first CSI process in which subframe patterns for a first subframe set based on an almost blank subframe (ABS) and a second subframe set which is not based on the ABS are configured; configuring a second CSI process in which the subframe patterns are not configured; configuring a first rank indicator (RI) corresponding to the second subframe set to be the same as a second RI of the second CSI process when the first CSI process and the second CSI process are configured to have the same RI as each other; and transmitting the CSI on the basis of at least one of the first CSI process and the second CSI process.

If the first CSI process and the second CSI process are configured to periodically report the CSI, the second RI may be set to the same value as that of the first RI which is reported most recently before the second RI is reported.

A second precoding matrix indicator (PMI) of the second CSI process may be set to the same value as that of a first PMI which is reported most recently before the second PMI is reported.

A second channel quality indicator (CQI) of the second CSI process may be set to the same value as that of a first CQI which is reported most recently before the second CQI is reported.

If the first CSI process and the second CSI process are configured to aperiodically report the CSI, and if the first CSI process and the second CSI process are requested to be CSI reported at the same time, the second RI may be set to the same value as that of the first RI corresponding to the second subframe set.

The second PMI and second CQI of the second CSI process may be set to the same values as those of the first CSI process, which are reported at the same time.

According to still another embodiment of the present invention, a user equipment for reporting channel state information (CSI) in a wireless communication system comprises radio frequency (RF) units; and a processor, wherein the processor is configured to configure a first CSI process in which subframe patterns for a first subframe set based on an almost blank subframe (ABS) and a second subframe set which is not based on the ABS are configured, configure a second CSI process in which the subframe patterns are not configured, configure a second rank indicator (RI) of the second CSI process to be the same as a first RI corresponding to the second subframe set when the second CSI process is configured to have the same RI as that of the first CSI process, and transmit the CSI on the basis of at least one of the first CSI process and the second CSI process.

According to further still another embodiment of the present invention, a user equipment for reporting channel state information (CSI) in a wireless communication system comprises radio frequency (RF) units; and a processor, wherein the processor is configured to configure a first CSI process in which subframe patterns for a first subframe set based on an almost blank subframe (ABS) and a second subframe set which is not based on the ABS are configured, configure a second CSI process in which the subframe patterns are not configured, configure a first rank indicator (RI) corresponding to the second subframe set to be the same as a second RI of the second CSI process when the first CSI process is configured to have the same RI as that of the second CSI process, and transmit the CSI on the basis of at least one of the first CSI process and the second CSI process.

The aforementioned description of the present invention and detailed description, which will be described later, are only exemplary, and are intended for additional description of the invention cited in claims.

Advantageous Effects

According to the embodiment of the present invention, channel state information may be transmitted and received more efficiently in a wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5(a)-(b) are schematic diagrams illustrating a wireless communication system having multiple antennas;

FIGS. 10 (a)-(b) are diagrams illustrating an environment of a macro cell and a pico cell to which an ABS is applied;

BEST MODE FOR CARRYING OUT THE INVENTION

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

Figure 1:
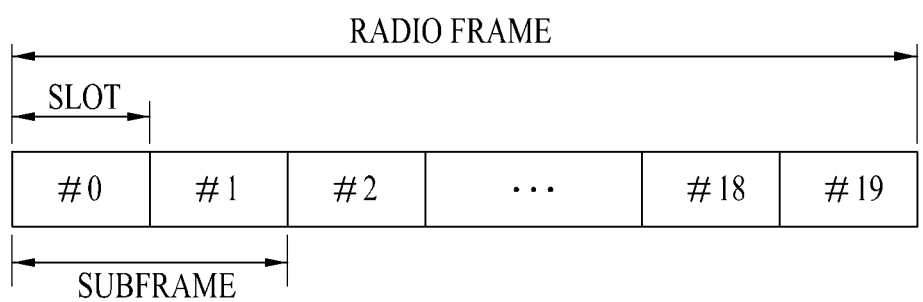
FIG. 1 is a diagram illustrating an example of a structure of a downlink radio frame.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
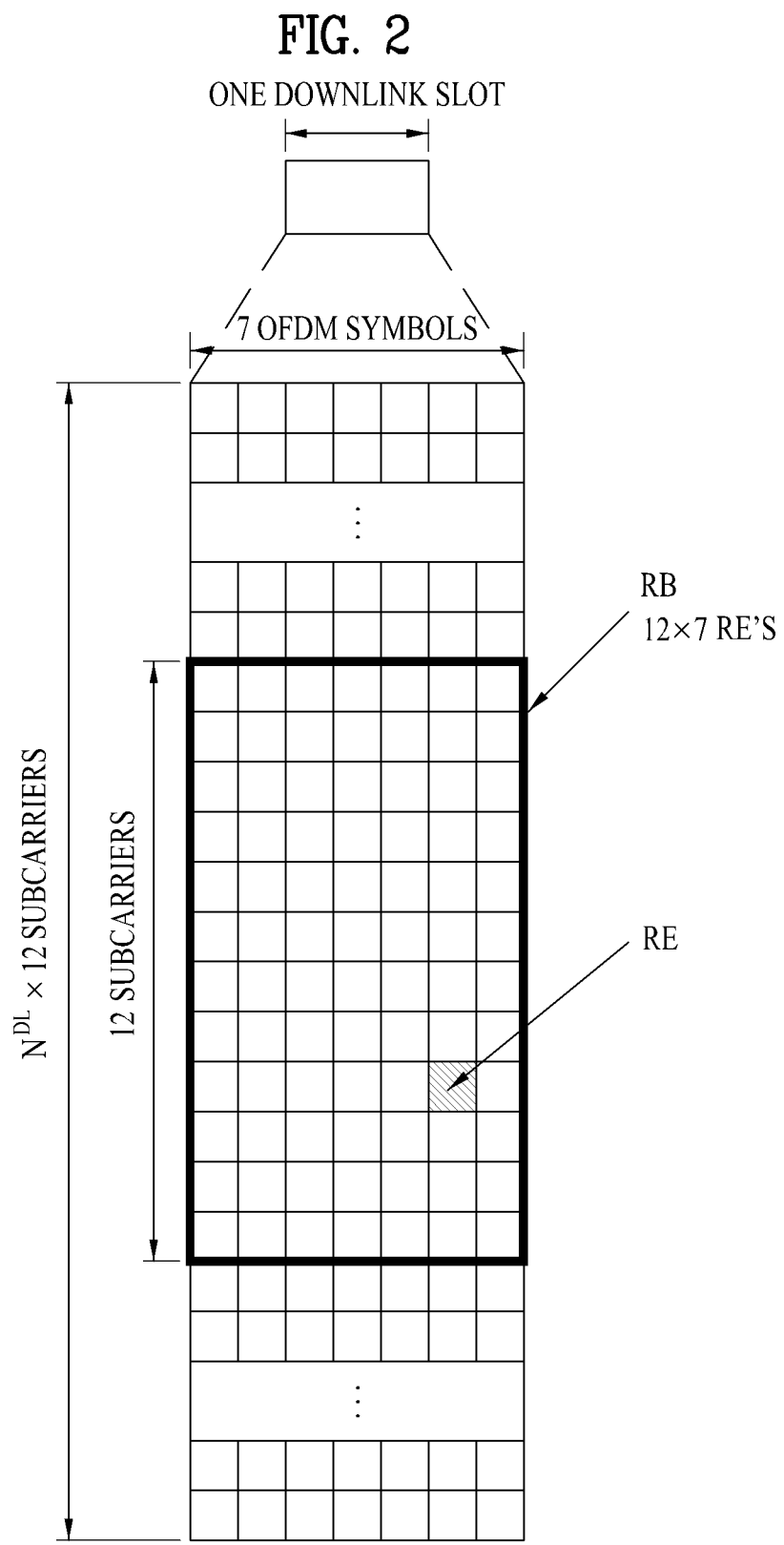
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
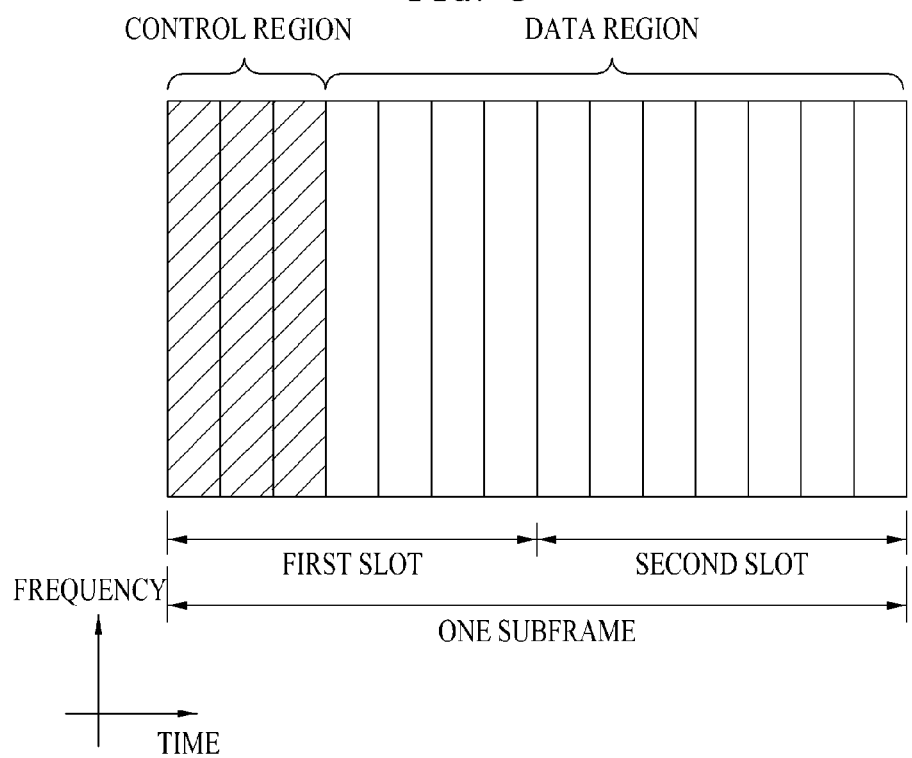
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
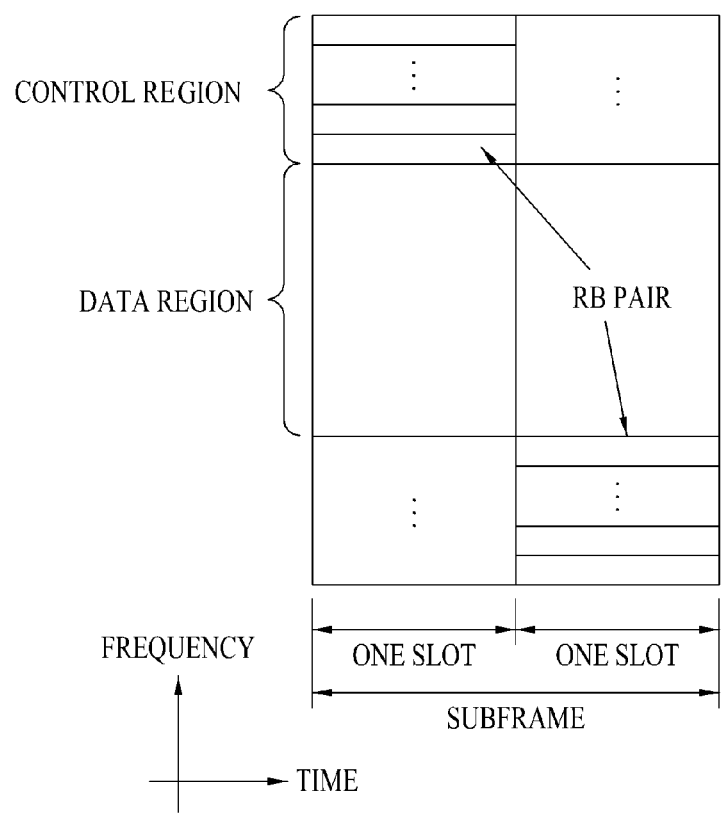
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $W_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a receiption signal of each antenna may be expressed as the vector shown in Equation 6 below.

$$y = [y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T = [h_{i1}, h_{i2}, \ldots, h_{iN_T}] \quad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix. The AWGN $(n_1, n_2, \ldots, n_{N_R})$ added to each of $N_R$ reception (Rx) antennas can be represented by Equation 9 below.

$$n = [n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
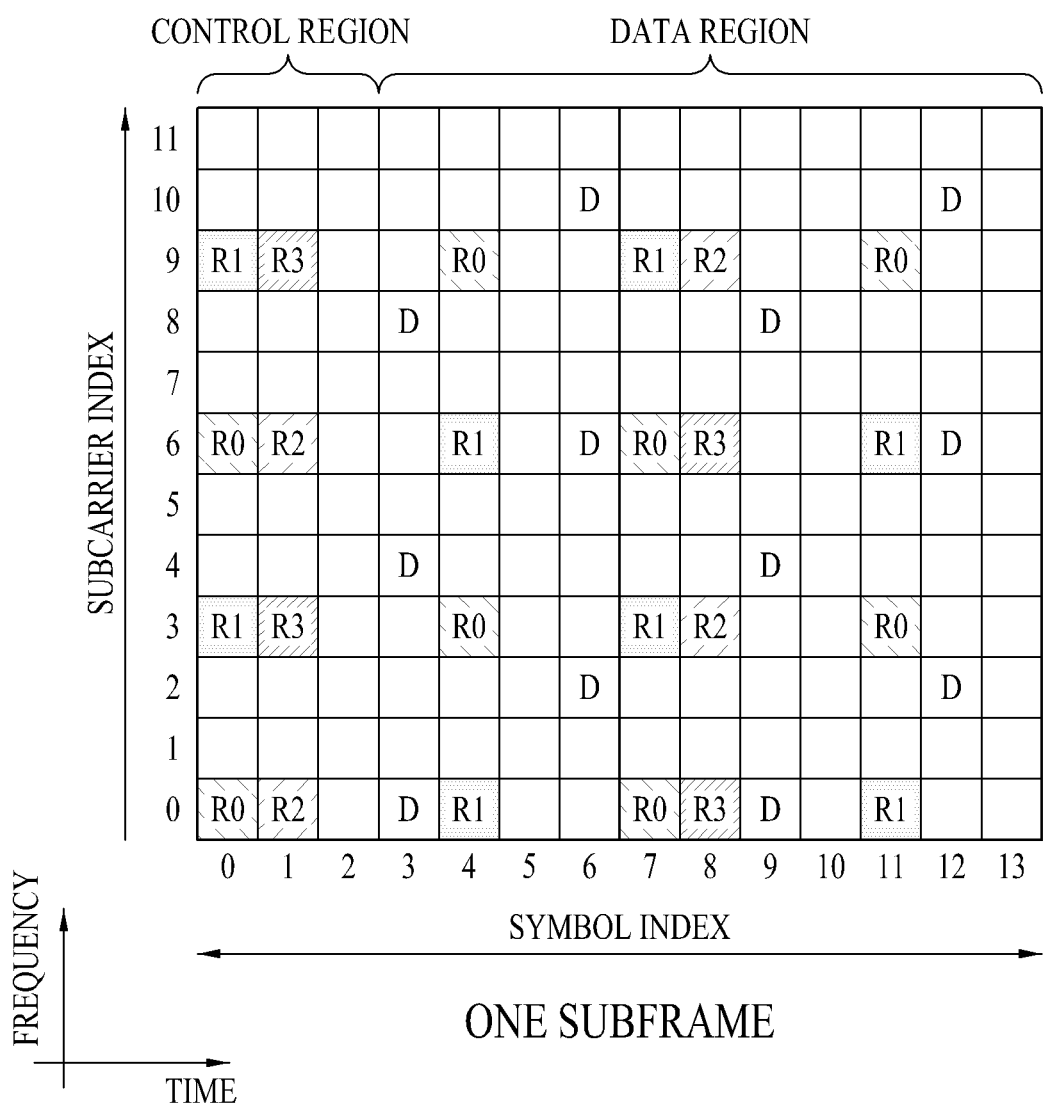
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'ID' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
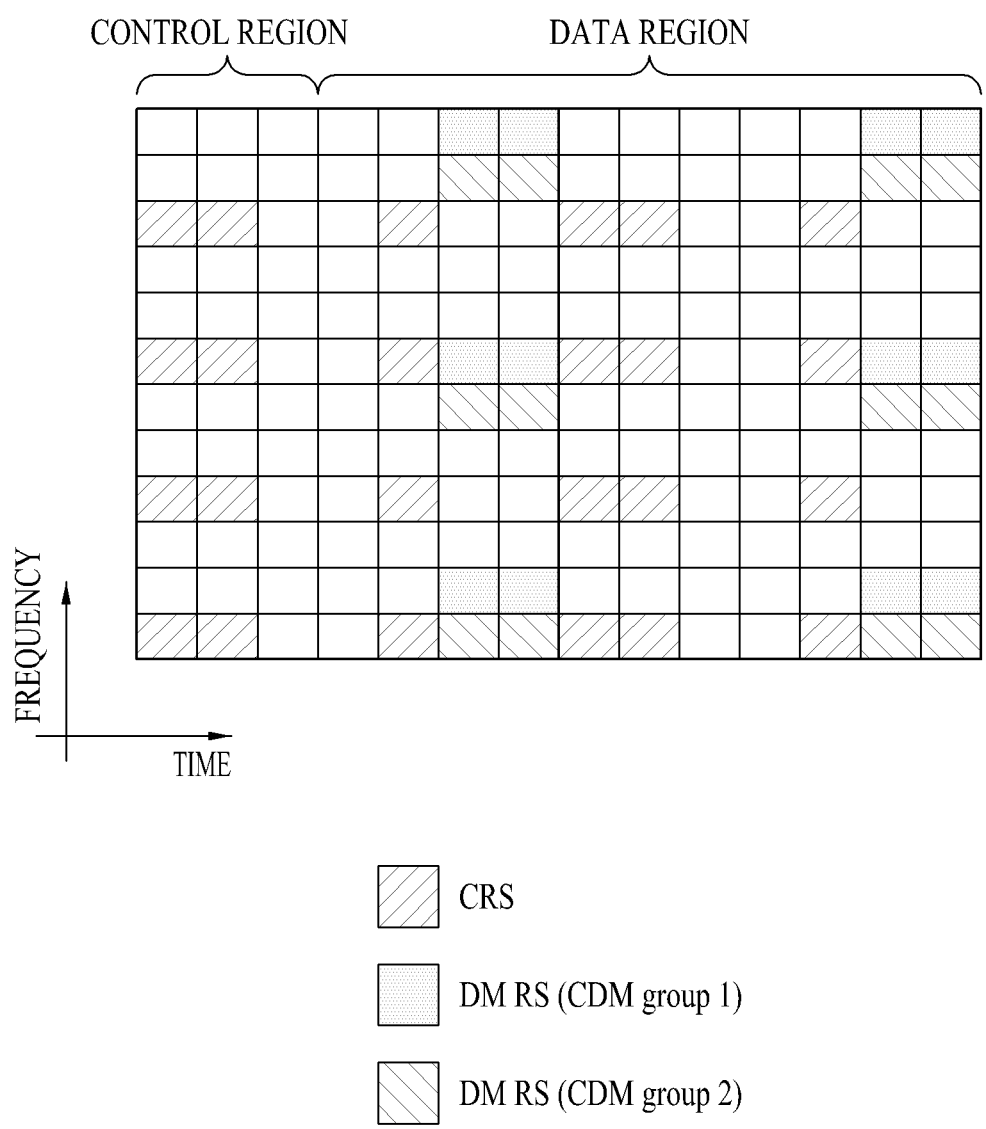
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
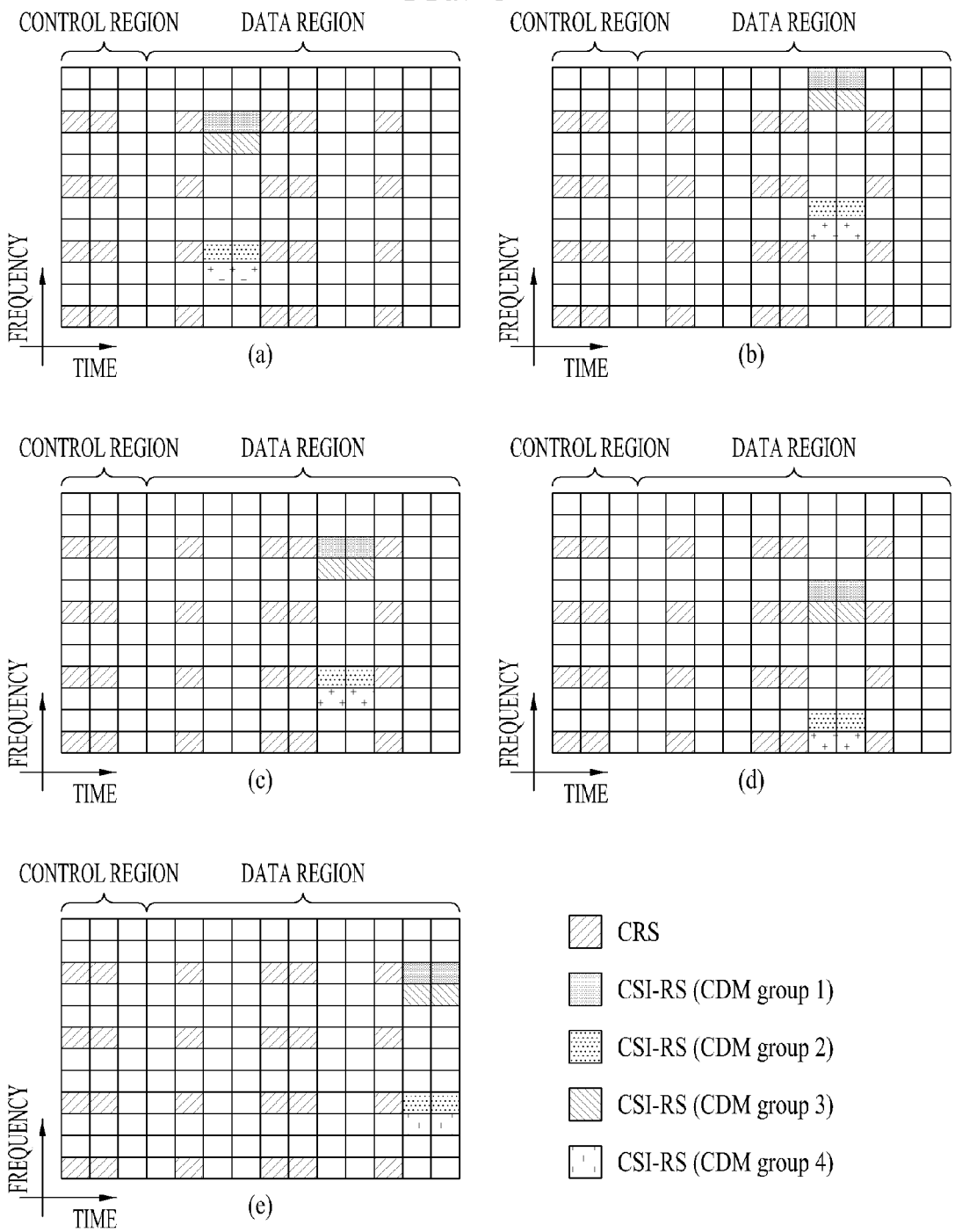
FIGS. 8 (a)-(e) are diagrams illustrating examples of a CSI-RS pattern.
Figure 9:
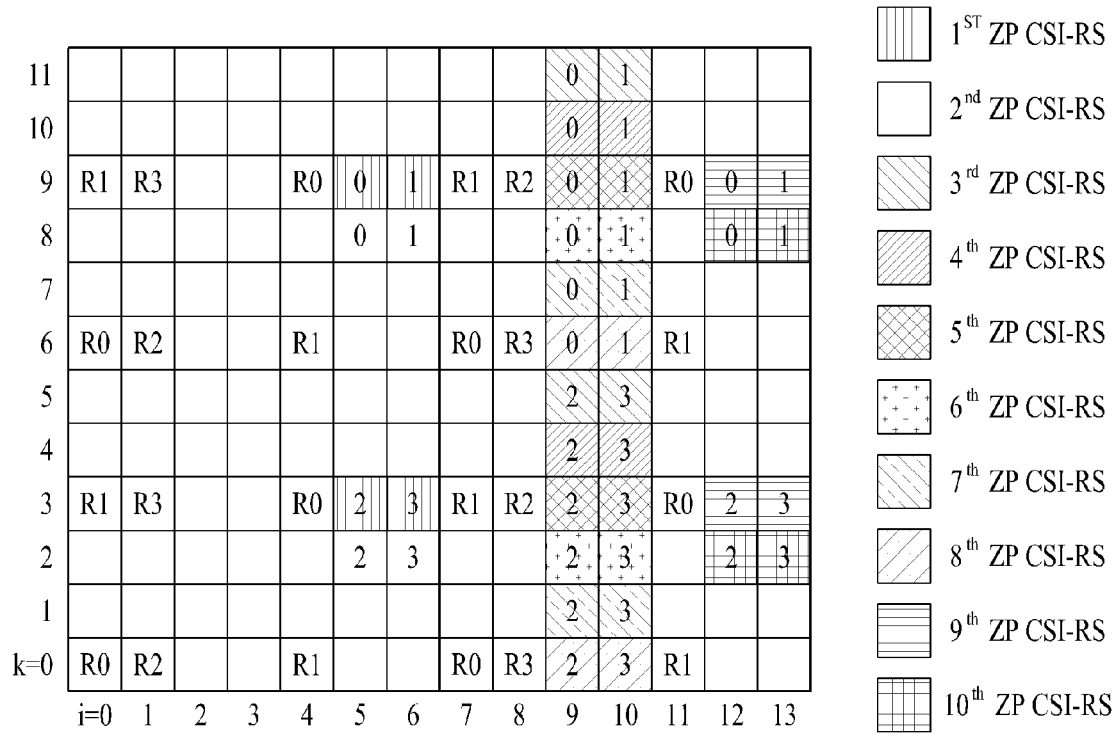
FIG. 9 is a diagram illustrating an example of a zero power (ZP) CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP), and Coordinated Scheduling/Beamforming (CS/CB).

ABS (Almost Blank Subframe)

Hereinafter, inter-cell interference coordination (ICIC) and an almost blank subframe (ABS) in a time domain will be described.

First of all, an ICIC scheme for time resources will be described. A 3GPP LTE-A (release-10) system may divide all time domains into several subframes and indicate whether silencing or reduced transmission power is applied to each subframe. On a time axis, ICIC means coordination between different cells as to how to use subframes. At this time, information on utilization of the subframe may be defined through backhaul signaling or an OAM (operation, administration and maintenance) configuration, and this will be referred to as the ABS.

FIG. 10 is a diagram illustrating an environment of a macro cell and a pico cell to which an ABS is applied. In (a) of FIG. 10, when a macro cell as an aggressor and a pico cell as a victim exist, the macro cell may protect a specific subframe so that the pico cell may not be affected by strong interference. Alternatively, in (b) of FIG. 10, when a pico cell as an aggressor and a macro cell as a victim exist, the pico cell may protect a specific subframe so that the macro cell may not be affected by strong interference. In other words, the ABS means a subframe at which transmission power is reduced, traffic or activity is reduced. Also, the ABS includes a subframe to which nothing is transmitted.

For the ABS, an X2 interface used for communication between eNBs may be used. To well use the ABS, the eNB may configure restricted measurement to a user equipment UE. To this end, the eNB transmits two different types of measurement sets based on the ABS to the UE.

In other words, the eNB, which has received the ABS pattern of a neighboring cell, especially an aggressor cell through the X2 interface, configures the measurement sets to its serving UE on the basis of the ABS pattern of the corresponding eNB. In the legacy 3GPP LTE system, the UE should measure CRS at all the subframes to select MCS, RI, and PMI. However, if the neighboring cell configures the ABS and the aggressor cell does not perform downlink signal transmission at the corresponding subframe or transmits a downlink signal at a reduced power, interference is varied depending on the ABS pattern, whereby the UE should perform measurement at a specific subframe.

To this end, the eNB may command a specific UE to perform measurement only for a specific subframe and the UE may perform measurement at the specific subframe. This will be referred to as restricted measurement.

For restricted measurement, information on some of subframes, which are configured as the ABS, should be transferred through the interface between the base stations. For example, examples of the information may include ABS information and an ABS status, which are defined in the 3GPP LTE-A standard.

First of all, the ABS information may include an "ABS pattern info" field indicating a subframe, which will be used as ABS, through a bitmap. The "ABS pattern info" field may include a bitmap of 40 bits in case of FDD and a bitmap of maximum 70 bits, although varied depending on UL-DL configuration, in case of TDD. The FDD will be described exemplarily. 40 bits indicate 40 subframes, and if a bit value is 1, it may indicate the ABS, and if a bit value is 0, it may indicate a non-ABS. When restricted measurement is configured for the UE, for CRS measurement, the number of CRS antenna ports of the corresponding cell may be notified to the UE. Also, a measurement subset is a recommended restricted measurement set for configuring restricted measurement.

Next, the ABS status information indicates whether the eNB should change the ABS pattern. "Usable ABS pattern Info" included in the ABS status information is a subset of "ABS Pattern Info", and indicates whether the subframe designated as ABS has been used for interference mitigation. Also, "DL ABS status" is a ratio of the number of DL RBs scheduled at the subframe indicated by "Usable ABS pattern Info" and the number of RBs allocated for UE, which should be protected through the ABS, from the number of the above DL RBs. The "DL ABS status" indicates information as to how the ABS has been efficiently used by the victim cell for its purpose.

As described above, the measurement subset comprised of subsets of the ABS pattern is the subframe used as a static ABS, and the other subframes included in the ABS pattern may be determined by the eNB whether they will be used as the ABS depending on traffic.

Restricted RLM and RRM/CSI Measurement

When a specific cell reduces a transmission power at a specific resource region, a variation rate of interference signals for each resource region, which are received by a neighboring cell, is increased. If an average of such interference signals is obtained regardless of the resource region, it is difficult to normally obtain effects of CoMP and ICIC.

For example, time domain ICIC is a means for protecting throughput of a pico cell by allowing a macro cell to use the ABS for UE of the pico cell for a certain time period. In particular, the macro cell reduces the transmission power to reach maximum 9 dB at a specific subframe, whereby cell range extension (CRE) effect of the pico cell is obtained. That is, in an environment where the macro cell and the pico cell, which have a relation of an aggressor cell and a victim cell, exist, the macro cell may reduce a downlink transmission power or does not perform signal transmission, whereby throughput of the pico cell may be obtained. The UE of the macro cell and the UE of the pico cell perform subframe-specific measurement in accordance with the ABS pattern of the macro cell. This operation will be referred to as restricted measurement. This is to calculate CSI based on a power level pattern of the macro cell.

If the macro cell reduces the transmission power at the specific subframe through the ABS, a signal and interference level of the pico cell, which are seen to the UE of the pico cell, are varied per subframe. In particular, a UE located at the cell edge may not detect a signal from its serving eNB of the UE due to strong interference at the subframe other than the ABS. Although variation of the interference signals per subframe occurs seriously, in order to avoid averaging of the interference signals, restricted measurement has been introduced.

For the UE that needs the restricted measurement, a plurality of subframe sets C0 and C1 for channel measurement may be configured by higher layer signaling (for example, RRC signaling). The UE performs specific channel measurement and reporting for the subframe sets in accordance with the configured subframe sets. Also, for radio link monitoring (RLM)/radio resource management (RRM), it is preferable that the UE of the pico cell performs measurement at the ABS.

If restricted measurement for CSI measurement is configured, that is, if subframe pattern for CSI report is configured, the UE measures and reports CSI per subframe pattern. For example, CSI-restricted measurement defined in the 3GPP LTE Rel-10 is as follows. If "csi-subframe-pattern-Config" is configured, the UE receives two types of CSI measurement patterns of "csi-Meas-subframe set 1" and "csi-Meas-subframe set 2". One of the two CSI measurement patterns is the subframe set for allowing the macro eNB to reduce interference to the pico eNB by using the ABS, and the other one is the subframe set used by the macro eNB as a normal subframe.

"csi-Meas-subframe set 1" may indicate a subframe set for allowing the macro eNB to mitigate interference through an operation of the ABS, and "csi-Meas-subframe set 2" may indicate a subframe set in which interference from the macro eNB is not mitigated. The serving eNB may signal CRS information of the aggressor cell to the UE while configuring restricted CSI measurement for the UE. The UE that has received CRS information of the aggressor eNB may report more improved CSI by performing CRS IC of the aggressor eNB at "csi-Meas-subframe set 1". However, even though the UE has CRS IC capability, the UE should not perform CRS IC at "csi-Meas-subframe set 2" of a normal subframe at which the aggressor eNB does not perform an operation for reducing a transmission power. This is because that interference at the other data RE except the CRS is not reduced even though CRS interference has been cancelled.

Even though the UE has received CRS information of the aggressor eNB, if "csi-subframe-pattern-Config" is not configured for the UE, the UE should not perform CRS IC for CSI measurement. That is, if "csi-Meas-subframe set 1" and "csi-Meas-subframe set 2" are not configured, the UE should not perform CRS IC for CSI measurement.

If "csi-subframe-pattern-Config" is configured for the UE but the UE does not receive CRS information of the aggressor eNB, the UE should not perform CRS IC operation for CSI measurement. If the UE performs CRS IC operation for CSI measurement at the specific subframe set, the UE should notify the eNB that the UE has performed CRS IC in calculating CSI value, and should notify the eNB of a corresponding subframe set at which the CRS IC operation has been performed.

If the eNB is intended to be reported CSI, to which CRS IC has been applied, at the specific subframe set by configuring "csi-subframe-pattern-Config" in the UE and providing CRS information of the aggressor eNB, the eNB should notify the UE of a subframe set at which the UE should perform CRS IC and a subframe set at which the UE should not perform CRS IC. Also, the subframe sets may be configured previously in the order of subframes signaled between the eNB and the UE. For example, if CRS information is given, "csi-Meas-subframe set 1" may be configured as the subframe set at which CRS IC should be performed, and "csi-Meas-subframe set 2" may be configured as the subframe set at which CRS IC should not be performed.

Cooperative Multipoint Transmission/Reception (CoMP) System

Hereinafter, CoMP will be described.

The post-LTE-A system considers a system that enhances system throughput through cooperation between cells. This system will be referred to a Cooperative Multipoint Transmission/Reception (CoMP) system. The CoMP system means a communication system that two or more base stations, access points or cells perform communication with the user equipment in cooperative with one another to effectively perform communication between a specific user equipment and the base station, access point or cell. In the present invention, the base station, the access point, or the cell may be used to refer to the same thing.

Generally, in a multi-cell environment where a frequency reuse factor is 1, throughput of the user equipment located at the cell edge and average sector throughput may be reduced due to inter-cell interference (ICI). In order to reduce ICI, a method for enabling a user equipment located at the cell edge in an environment restricted by interference to have proper throughput by using a simple passive scheme such as fractional frequency reuse (FFR) through user equipment specific power control has been applied to the LTE system according to the related art. However, it may be more preferable to reduce ICI or allow the user equipment to reuse ICI as a desired signal than to reduce use of frequency resources per cell. To this end, a CoMP transmission scheme may be used.

Figure 11:
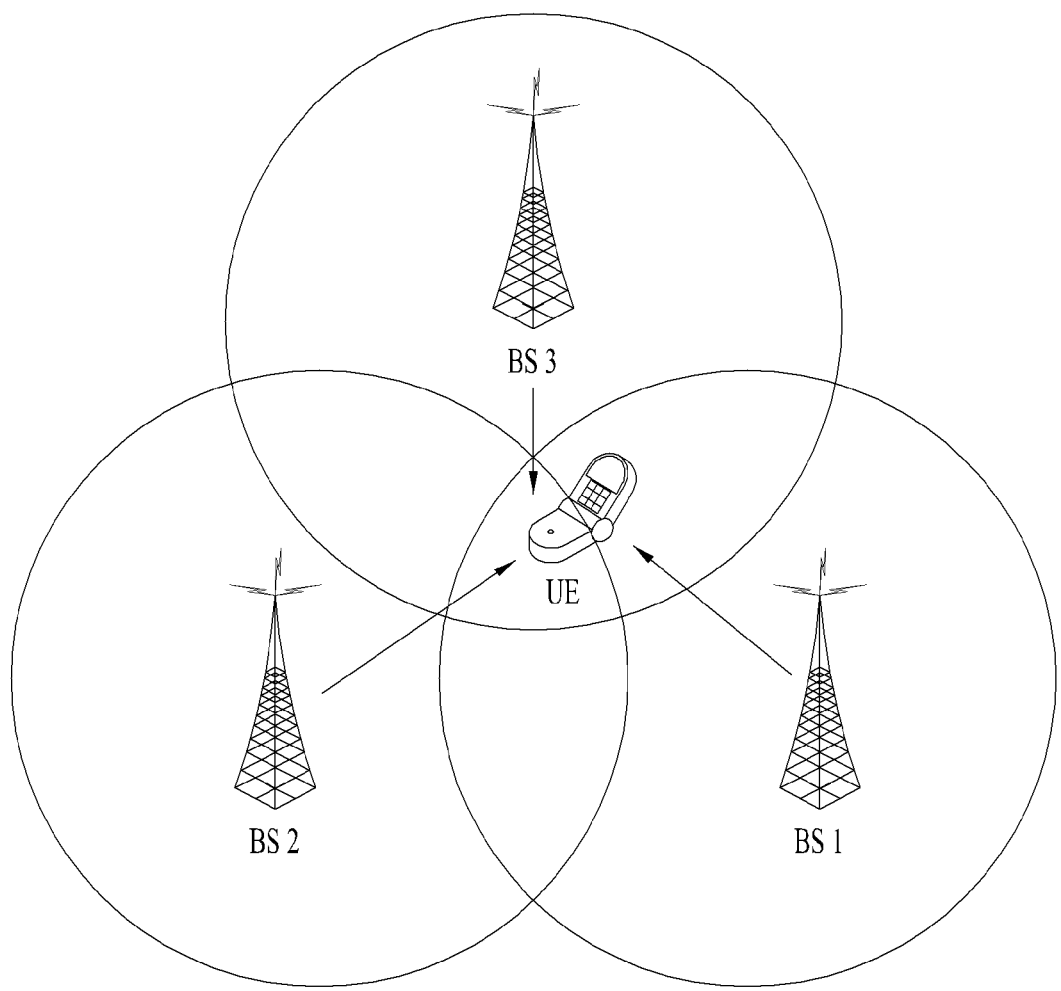
FIG. 11 is a diagram illustrating an example that CoMP is performed.

FIG. 11 is a diagram illustrating an example of performing CoMP. Referring to FIG. 11, the wireless communication system includes a plurality of base stations BS1, BS2 and BS3, which perform CoMP, and a user equipment. The plurality of base stations BS1, BS2 and B3 that perform CoMP may efficiently transmit data to the user equipment in cooperative with one another.

Examples of the CoMP transmission scheme may include a coordinated MIMO type joint processing (CoMP-JP) scheme through data sharing and a CoMP-coordinated scheduling/beamforming (CoMP-CS/CB) scheme.

In case of a downlink, according to the joint processing (CoMP-JP) scheme, the user equipment may simultaneously receive data from each base station that performs the CoMP transmission scheme, and may improve receiving throughput by combining the signals received from each base station (joint transmission; JT). Also, there may be considered a method (dynamic point selection, DPS) for transmitting data from one of base stations, which perform the CoMP transmission scheme, to the user equipment at a specific time. Unlike this method, according to the coordinated scheduling/beamforming (CoMP-CS/CB) scheme, the user equipment may momentarily receive data from one base station, that is, a serving base station, through beamforming.

In case of an uplink, according to the joint processing (CoMP-JP) scheme, the respective base stations may simultaneously receive a PUSCH signal from the user equipment (Joint Reception; JR). Unlike this, according to the coordinated scheduling/beamforming (CoMP-CS/CB) scheme, only one base station may receive a PUSCH signal. At this time, cooperative cells (or base stations) may determine to use the coordinated scheduling/beamforming scheme.

Channel State Information (CSI) Feedback of CoMP System

The user equipment, which uses the CoMP transmission scheme, that is, CoMP UE may feed channel information back (CSI feedback) to a plurality of base stations that perform the CoMP transmission scheme. A network scheduler may select a proper CoMP transmission scheme that may increase a transmission rate, from the CoMP-JP scheme, the CoMP-CS/CB scheme and the DPS scheme, on the basis of the CSI feedback. To this end, the CoMP UE may configure CSI feedback within a plurality of base stations, which perform the CoMP transmission scheme, in accordance with a periodic feedback transmission scheme based on an uplink PUCCH. In this case, feedback configuration for each base station may be independent mutually. Accordingly, in this specification according to one embodiment of the present invention, feedback operation of channel information in accordance with independent feedback configuration will be referred to as CSI process. One or more CSI processes may exist in one serving cell.

Figure 12:
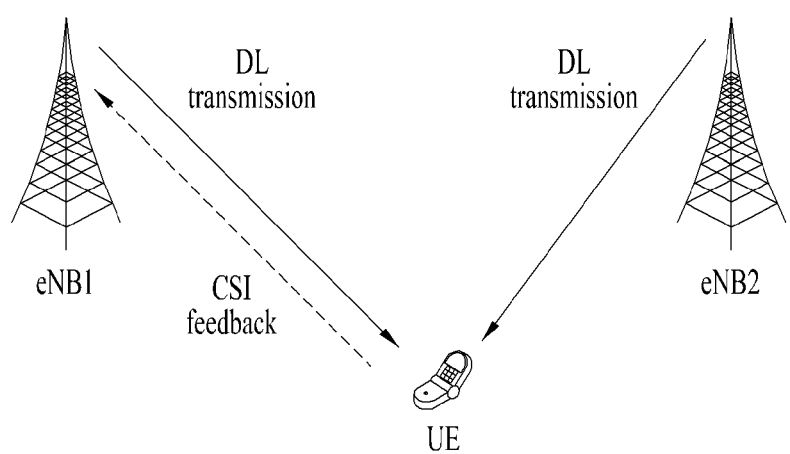
FIG. 12 is a diagram illustrating that downlink CoMP operation is performed.

FIG. 12 is a diagram illustrating that downlink CoMP operation is performed.

In FIG. 12, the UE is located between eNB1 and eNB2, and two eNBs (that is, eNB1 and eNB2) perform a proper CoMP operation such as JT, DCS, and CS/CB to solve interference to the UE. The UE performs proper CSI feedback to assist CoMP operation of the base station. Information transmitted through CSI feedback includes PMI information and CQI information of each eNB, and may additionally include channel information (for example, phase offset information between two eNBs) between two eNBs for JT.

In FIG. 12, although the UE transmits a CSI feedback signal to the eNB1 which is its serving cell, the UE may transmit the CSI feedback signal to the eNB2 or two eNBs in accordance with the status. Also, although FIG. 12 illustrates eNB as a basis unit for joining CoMP, in addition to the eNB, a transmission point controlled by the eNB may be a basic unit for joining CoMP.

For CoMP scheduling at the network, the UE should feed back downlink (DL) CSI information of a neighboring eNB, which joins CoMP, as well as downlink CSI information of a serving eNB. To this end, the UE feeds back a plurality of CSI processes, which reflect various data transmission eNBs and various interference environments.

Accordingly, in the LTE system, an interference measurement resource (IMR) is used for interference measurement during CoMP CSI calculation. A plurality of IMRs may be configured for one UE, and one UE has independent configuration for each of the plurality of IMRs. In other words, period, offset and resource of each IMR are independently configured, and the base station may transmit a signal of such configurations to the UE through higher layer signaling (RRC, etc.).

Also, in the LTE system, CSI-RS is used for channel measurement required during CoMP CSI calculation. A plurality of CSI-RSs may be configured for one UE, and at this time, each CSI-RS has independent configuration. In other words, period, offset, resource, power control (PC), and the number of antenna ports of each CSI-RS are independently configured, and information related to the CSI-RS is signaled from the base station to the UE through higher layer signaling (RRC, etc.).

Among the plurality of CSI-RSs and the plurality of IMRs, which are configured for the UE, one CSI process may be defined by associating one CSI-RS resource for signal measurement with one IMR for interference measurement. The UE feeds back CSI information derived from different CSI processes to the network (for example, base station) by using an independent period and subframe offset.

In other words, each CSI process has independent CSI feedback configuration. Association information on the CSI-RS resource and the IMR resource and CSI feedback configuration may be notified from the base station to the UE through higher layer signaling such as RRC per CSI process. For example, it is assumed that three CSI processes are configured for the UE as illustrated in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent CSI-RS received from the eNB 1 which is a serving base station (serving eNB) of the UE and CSI-RS received from the eNB 2 which is a neighboring eNB which joins cooperation. It is assumed that IMR configured for each CSI process of Table 1 is configured as illustrated in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, the eNB 1 performs muting, the eNB 2 performs data transmission, and the UE is configured to measure interference from the other eNBs except the eNB 1. Likewise, in IMR 1, the eNB 2 performs muting, the eNB 1 performs data transmission, and the UE is configured to measure interference from the other eNBs except the eNB 2. Also, in IMR 2, both the eNB 1 and the eNB 2 perform muting, and the UE is configured to measure interference from the other eNBs except the eNB 1 and the eNB 2.

Accordingly, as illustrated in Table 1 and Table 2, CSI information of the CSI process 0 represents optimized RI, PMI and CQI information if data are received from the eNB 1. CSI information of the CSI process 1 represents optimized RI, PMI and CQI information if data are received from the eNB 2. CSI information of the CSI process 2 represents optimized RI, PMI and CQI information if data are received from the eNB 1 and if there is no interference from the eNB 2.

Reference CSI Process

It is preferable that CSI processes configured for one UE may share dependent values for CoMP scheduling. For example, in case of joint transmission (JP) of transmission points TP1 and TP2, a first CSI process for the first cell and a second CSI process for the second cell need to have the same RI and subband index in order to easily perform JT scheduling.

Accordingly, some or all CSI processes among CSI processes configured for the UE may be restricted to have a common CSI (for example, RI, PMI or selected subband index) value. For convenience of description, among CSI processes restricted to have the common CSI value, a CSI process which is a reference for configuration of a CSI value is referred to as a reference CSI process, and the other CSI processes except the reference CSI process are each referred to as a linked CSI process. The liked CSI process may feedback the same value as a CSI value of the reference CSI process without separate calculation.

For example, CSI of the linked CSI process is configured to CSI reported by the reference CSI process most recently at the reporting time of the corresponding CSI or before the reporting time of the corresponding CSI. Also, for convenience of description, the case where the reference CSI process and the linked CSI process have a common RI has been described. However, the present invention may be applied to even a case where the reference CSI process and the linked CSI process have a common PMI or a common selected subband index without limitation to the above case. Hereinafter, RI of the reference CSI process will be referred to as a reference RI, and RI of the linked CSI process will be referred to as a linked RI.

Subframe Set Configured in CSI Process

A subframe set may be configured for one CSI process. For example, the base station may configure a subframe set in the user equipment through higher layer signaling (for example, RRC signaling). RI, PMI and CQI of the CSI process in which the subframe set is configured are configured independently per subframe set.

At this time, the subframe set may include a subframe set 1 corresponding to the ABS and a subframe set 2 corresponding to a normal subframe. On the other hand, the subframe set 1 may correspond to a normal subframe while the subframe set 2 may correspond to the ABS.

The UE determines RI, PMI and CQI of the first subframe set by using resources such as CRS, CSI-RS and IMR which exist in the first subframe set. Also, the UE determines RI, PMI and CQI of the second subframe set by using resources such as CRS, CSI-RS and IMR which exist in the second subframe set.

In the LTE-A system, a subframe set may be configured independently for each of a plurality of CSI processes. For example, if two CSI processes exist, a subframe set is configured for one CSI process but may not be configured for the other one CSI process.

At this time, if subframe sets are configured asymmetrically for the reference CSI process and the linked CSI process, a problem occurs in that application of the reference CSI process becomes ambiguous. That is, if the subframe set is configured for one of the linked CSI process and the reference CSI process and is not configured for the other one, application of the reference CSI process becomes ambiguous.

In more detail, in the case that the subframe set is configured for the reference CSI process and is not configured for the linked CSI process, it is ambiguous whether one of the reference RI corresponding to the subframe set 2 of the reference CSI process and the reference RI corresponding to the subframe set 1 should be determined as the linked RI.

Also, even in the case that the subframe set is configured for the linked CSI process and is not configured for the reference CSI process, it is ambiguous whether both or a part of the linked RI corresponding to the subframe set 2 and the linked RI corresponding to the subframe set 1 should be determined as the reference RI.

Hereinafter, in order to solve the aforementioned problems, a method for determining a reference CSI when asymmetrical subframe set is configured will be described. In the following embodiments, it is assumed that the subframe set 1 corresponds to a normal subframe and the subframe set 2 corresponds to the ABS. However, the following embodiments may be applied to even a case where the subframe set 1 corresponds to the ABS and the subframe set 2 corresponds to a normal subframe, without limitation to the above assumption.

First Embodiment

First of all, the first embodiment according to the present invention illustrates a method for determining whether to apply a reference CSI process when a subframe set is configured for a reference CSI process and is not configured for a linked CSI process.

According to the first embodiment of the present invention, the UE sets the linked RI to the same value as that of the reference RI corresponding to the subframe set 2 of the reference CSI process. In this case, the subframe set 2 of the reference SI process is the subframe set corresponding to a normal subframe. Since the subframe set is not configured for the linked CSI process, it is regarded that the CSI corresponding to the normal subframe is reported. Accordingly, it is preferable that the linked RI is set to the same value as that that of the reference RI corresponding to the subframe set 2 of the reference CSI process.

The first embodiment of the present invention may be implemented in the same manner as the following embodiment 1-1 or 1-2 depending on periodic feedback or aperiodic feedback.

1-1th Embodiment (periodic feedback mode)

In the periodic feedback mode, CSI of each CSI process is periodically transmitted through a PUCCH in accordance with period and offset set by higher layer signaling (for example, RRC signaling).

Hereinafter, a detailed method for determining whether to apply a reference CSI process in case of periodic feedback mode when a subframe set is configured for a reference CSI process and is not configured for a linked CSI process will be described.

First of all, RI of the linked CSI process may be set to RI value of a subframe set 2 reported by the reference CSI process most recently at the reporting time of the corresponding RI or before the reporting time of the corresponding RI. Also, when the UE determines PMI or CQI of the linked CSI process, the UE determines the PMI or CQI based on the RI of the linked CSI process, which is reported most recently.

Next, RI of the linked CSI process is determined in the same manner as the aforementioned description. PMI or CQI of the linked CSI process may be determined as the value of the subframe set 2 of the reference CSI process. That is, PMI or CQI of the linked CSI process may be set based on the RI value of the subframe set 2 reported by the reference CSI process most recently at the reporting time of the corresponding PMI or CQI or before the reporting time of the corresponding PMI or CQI.

For another example, in the case that the subframe set is configured for the reference CSI process and is not configured for the linked CSI process, RI of the linked CSI process is set independently from the reference CSI process. That is, RI of the linked CSI process is determined independently in accordance with a channel environment of the linked CSI process without depending on RI of the reference CSI process. The UE reports the determined CSI to the base station.

1-2th Embodiment (aperiodic feedback mode)

In the aperiodic feedback mode, RI, PMI and CQI are together transmitted through a PUSCH at the same subframe.

At this time, if the linked CSI process and the reference CSI process are not CSI report triggered at the same time, RI of each process is determined independently.

On the other hand, if the linked CSI process and the reference CSI process are CSI report triggered at the same time, a common RI is set, or RI is independently set depending on whether the CSI report triggering time of the reference CSI process is the subframe set 1 or the subframe set 2.

That is, in the case that the subframe set is configured for the reference CSI process and is not configured for the linked CSI process and triggering is generated at the subframe set 1 of the reference CSI process, RI of the linked CSI process is reported independently. By contrast, in the case that the subframe set is configured for the reference CSI process and is not configured for the linked CSI process and triggering is generated at the subframe set 2 of the reference CSI process, a common RI is reported.

In short, if the linked CSI process and the reference CSI process are CSI report triggered at different times or CSI report triggered simultaneously with the linked CSI process at the subframe set 1 of the reference CSI process, RI of the linked CSI process is set independently from the reference CSI process. On the other hand, if the linked CSI process and the reference CSI process are CSI report triggered simultaneously with the linked CSI process at the subframe set 2 of the reference CSI process, the linked CSI process reports a common RI.

Also, when determining PMI or CQI of the linked CSI process, the UE determines the PMI or CQI based on RI of the linked CSI process, which is transmitted at the same subframe. The UE reports the determined CSI to the base station.

Second Embodiment

The second embodiment according to the present invention illustrates a method for determining whether to apply a reference CSI process when a subframe set is configured for a linked CSI process and is not configured for a reference CSI process.

According to the second embodiment of the present invention, the UE sets the linked RI to the same value as that of the reference RI corresponding to the subframe set 2 of the linked CSI process, and sets a linked RI corresponding to the subframe set 1 of the linked CSI process independently in accordance with a channel environment. Since the subframe set is not configured for the reference CSI process, CSI corresponding to the normal subframe is reported.

The second embodiment of the present invention may be implemented in the same manner as the following embodiment 2-1 or 2-2 depending on periodic feedback or aperiodic feedback.

2-1th Embodiment (periodic feedback mode)

In the periodic feedback mode, CSI of each CSI process is periodically transmitted through a PUCCH in accordance with period and offset set by higher layer signaling (for example, RRC signaling).

Hereinafter, a detailed method for determining whether to apply a reference CSI process in case of a periodic feedback mode when a subframe set is configured for a linked CSI process and is not configured for a reference CSI process will be described.

First of all, RI of a subframe set 2 of the linked CSI process may be set to RI value reported by the reference CSI process most recently at the reporting time of the corresponding RI or before the reporting time of the corresponding RI. Also, when the UE determines PMI or CQI of the subframe set 2 of the linked CSI process, the UE determines the PMI or CQI based on the RI of the subframe set 2 of the linked CSI process, which is reported most recently.

RI corresponding to the subframe set 1 of the linked CSI process is determined independently based on CRS, CSI-RS and IMR which exist in the subframe set 1. Also, when determining PMI or CQI of the subframe set 1 of the linked CSI process, the UE determines the PMI or CQI based on RI of the subframe set 1 of the linked CSI process, which is reported most recently. The UE reports the determined CSI to the base station.

Next, RI of the linked CSI process is determined in the same manner as the aforementioned description. PMI or CQI of the subframe set 2 of the linked CSI process may be determined as the value of the reference CSI process. That is, PMI or CQI of the subframe set 2 of the linked CSI process may be set based on the RI value reported by the reference CSI process most recently at the reporting time of the corresponding PMI or CQI or before the reporting time of the corresponding PMI or CQI. On the other hand, PMI or CQI of the subframe set 1 of the linked CSI process may be set based on the RI value of the subframe set 1 of the linked CSI process, which is reported most recently. The UE reports the determined CSI to the base station.

For another example, in the case that the subframe set is configured for the linked CSI process and is not configured for the reference CSI process, RI of the linked CSI process is set independently from the reference CSI process. That is, RI of the linked CSI process is determined independently in accordance with a channel environment of the linked CSI process without depending on RI of the reference CSI process. The UE reports the determined CSI to the base station.

2-2th Embodiment (aperiodic feedback mode)

In the aperiodic feedback mode, RI, PMI and CQI are together transmitted through a PUSCH at the same subframe.

At this time, if the linked CSI process and the reference CSI process are not CSI report triggered at the same time, RI of each process is determined independently.

On the other hand, if the linked CSI process and the reference CSI process are CSI report triggered at the same time, a common RI is set or RI is set independently depending on whether the CSI report triggering time of the linked CSI process is the subframe set 1 or the subframe set 2.

That is, if the subframe set 1 of the linked CSI process and the reference CSI process are triggered at the same time, RI of the linked CSI process is reported independently. By contrast, if the subframe set 2 of the linked CSI process and the reference CSI process are triggered at the same time, a common RI is reported at the subframe set 2 of the linked CSI process.

In short, if the linked CSI process and the reference CSI process are CSI report triggered at different times or CSI report triggered simultaneously with the reference CSI process at the subframe set 1 of the linked CSI process, RI of the linked CSI process is set independently from the reference CSI process. On the other hand, if the linked CSI process and the reference CSI process are CSI report triggered simultaneously with the reference CSI process at the subframe set 2 of the linked CSI process, a common RI is reported at the subframe set 2 of the linked CSI process.

Also, when determining PMI or CQI of the linked CSI process, the UE determines the PMI or CQI based on RI of the linked CSI process, which is transmitted at the same subframe. The UE reports the determined CSI to the base station.

Third Embodiment

In the meantime, according to the third embodiment of the present invention, in the case that an asymmetric subframe set is configured, reference RI may not be used. That is, in the case that the subframe set is configured for the reference CSI process and is not configured for the linked CSI process, RI of the linked CSI process may be set independently from the reference CSI process. Likewise, in the case that the subframe set is configured for the linked CSI process and is not configured for the reference CSI process, RI of the linked CSI process may be set independently from the reference CSI process. At this time, RI of the linked CSI process is determined independently in accordance with a channel environment of the linked CSI process. The UE may report the determined CSI to the base station.

Fourth Embodiment

If a plurality of CSI processes are configured for the UE, the base station may receive aperiodic CSI feedback based on PUSCH by using a CSI request field defined in a DCI format 0 or 4. The fourth embodiment describes the 2-bit CSI request field in the present invention.

TABLE 3

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

For example, the base station may configure CSI set for the UE as follows.

TABLE 4

| Value of CSI request field | Description |
| --- | --- |
| '00' | No aperiodic CSI report is triggered |
| '01' | Aperiodic CSI report is triggered for CSI process 0 for serving cell c |
| '10' | Aperiodic CSI report is triggered for CSI process 1 for serving cell c |
| '11' | Aperiodic CSI report is triggered for CSI process 0 and 1 for serving cell c |

In the case that the CSI process 0 and the CSI process 1 of Table 4 are configured to the reference CSI process and the linked CSI process, respectively and configured to have a common RI, the UE sets RI as follows in accordance with each CSI request field value.

First of all, in the same manner as the first embodiment, in the case that the subframe set is configured for the reference CSI process and is not configured for the linked CSI process, RI is set in accordance with the CSI request field.

If the CSI request field is '01', the UE determines RI of the reference CSI process independently and then feeds back the determined RI.

If the CSI request field is '10', the UE determines RI of the linked CSI process independently and then feeds back the determined RI. That is, the UE determines RI by using resources such as CRS, CSI-RS and IMR of the linked CSI process without referring to RI of the reference CSI process.

If the CSI request field is '11', and if the linked CSI process and the reference CSI process are together CSI report triggered at the subframe set 2, the UE sets RI of the linked CSI process to the same value as reference RI corresponding to the subframe set 2. On the other hand, if the linked CSI process and the reference CSI process are together CSI report triggered at the subframe set 1, the UE sets RI of the linked CSI process independently from the reference CSI process. When determining PMI or CQI of the linked CSI process, the UE determines the PMI or CQI based on RI of the linked CSI process, which is transmitted at the same subframe. The UE reports the determined CSI to the base station.

Next, in the case that the subframe set is configured for the linked CSI process and is not configured for the reference CSI process in the same manner as the second embodiment, RI is set as follows in accordance with the CSQ request field value.

If the CSI request field is '01', the UE determines RI of the reference CSI process independently and then feeds back the determined RI. That is, the UE determines RI by using resources such as CRS, CSI-RS and IMR of the reference CSI process.

If the CSI request field is '10', the UE determines RI of the linked CSI process independently and then feeds back the determined RI. That is, the UE determines RI by using resources such as CRS, CSI-RS and IMR of the linked CSI process without referring to RI of the reference CSI process.

If the CSI request field is '11', and if the linked CSI process and the reference CSI process are together CSI report triggered at the subframe set 2, the UE sets RI corresponding to the subframe set 2 of the linked CSI process to the same value as reference RI. On the other hand, if the linked CSI process and the reference CSI process are together CSI report triggered at the subframe set 1, the UE sets RI of the linked CSI process independently from the reference CSI process. When determining PMI or CQI of the linked CSI process, the UE determines the PMI or CQI based on RI of the linked CSI process, which is transmitted at the same subframe. The UE reports the determined CSI to the base station.

Fifth Embodiment

According to the fifth embodiment, the base station may designate a subframe set to which a common RI is applied, through higher layer signaling (for example, RRC signaling).

The base station designates one of subframe sets through a control signal such as RRC signaling, and the UE determines RI of the linked CSI process based on the designated subframe set.

If the UE is operated in a periodic feedback mode, the base station may designate one of the subframe sets through the control signal such as RRC signaling, and the UE may set a linked RI to the same value as reference RI corresponding to the designated subframe set. If the UE is operated in an aperiodic feedback mode, a common RI may be used only when the linked CSI process and the reference CSI process are simultaneously CSI report triggered at the designated subframe set.

Figure 13:
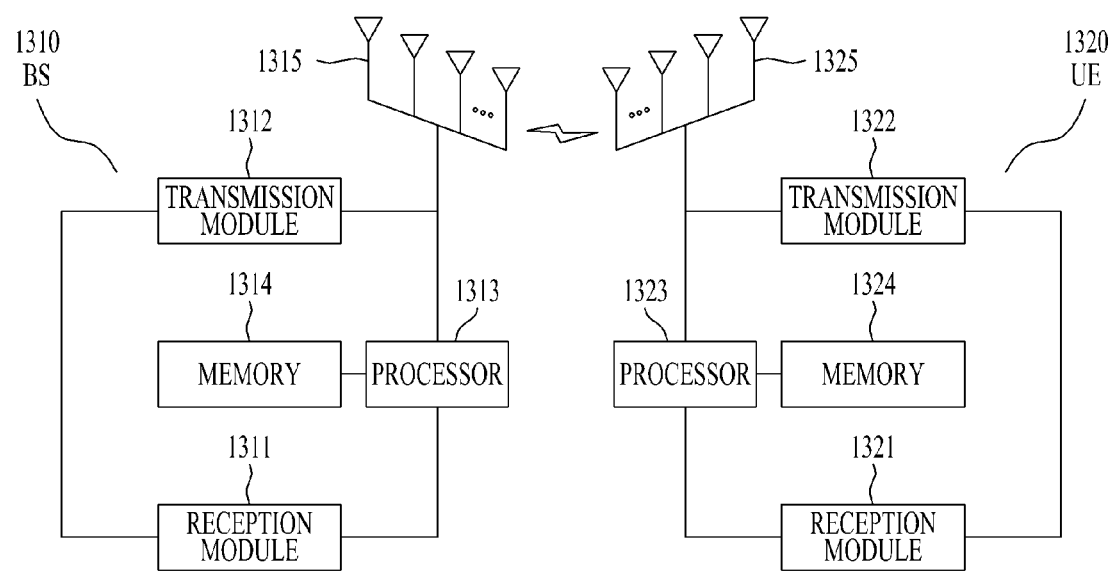
FIG. 13 is a diagram illustrating a base station and a user equipment which may be applied to one embodiment of the present invention.

FIG. 13 is a diagram illustrating a base station and a user equipment, which may be applied to one embodiment of the present invention.

If a relay is included in a wireless communication system, communication in a backhaul link is performed between the base station and the relay and communication in an access link is performed between the relay and the user equipment.

Accordingly, the base station or the user equipment as shown may be replaced with the relay depending on the circumstances.

Referring to FIG. 13, the wireless communication system includes a base station 1310 and a user equipment 1320. The base station 1310 includes a processor 1313, a memory 1314, and radio frequency (RF) units 1311 and 1312. The processor 1313 may be configured to implement procedures and/or methods suggested in the present invention. The memory 1314 is connected with the processor 1313 and stores various kinds of information related to the operation of the processor 1313. The RF units 1311 and 1312 are connected with the processor 1313 and transmit and/or receive a radio signal. The user equipment 1320 includes a processor 1323, a memory 1324, and radio frequency (RF) units 1321 and 1322. The processor 1323 may be configured to implement procedures and/or methods suggested in the present invention. The memory 1324 is connected with the processor 1323 and stores various kinds of information related to the operation of the processor 1323. The RF units 1321 and 1322 are connected with the processor 1323 and transmit and/or receive a radio signal. The base station 1310 and/or the user equipment 1320 may have a single antenna or multiple antennas. The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been herein described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention may be used for wireless communication devices such as a user equipment, a relay and a base station.

The invention claimed is:

1. A method of reporting channel state information (CSI) in a wireless communication system, the method performed by a user equipment and comprising:
    configuring a first CSI process, in which subframe patterns for a first subframe set based on an almost blank subframe (ABS) and a second subframe set which is not based on the ABS are configured;
    configuring a second CSI process in which the subframe patterns are not configured;
    configuring a second rank indicator (RI) of the second CSI process to be the same as a first RI corresponding to the second subframe set when the second CSI process is configured to have the same RI as that of the first CSI process; and
    transmitting the CSI on the basis of at least one of the first CSI process and the second CSI process.

2. The method of claim 1, wherein, if the first CSI process and the second CSI process are configured to periodically report the CSI, the second RI is set to the same value as that of the first RI which is reported most recently before the second RI is reported.

3. The method of claim 2, wherein a second precoding matrix indicator (PMI) of the second CSI process is set to the same value as that of a first PMI which is reported most recently before the second PMI is reported.

4. The method of claim 2, wherein a second channel quality indicator (CQI) of the second CSI process is set to the same value as that of a first CQI which is reported most recently before the second CQI is reported.

5. The method of claim 1, wherein, if the first CSI process and the second CSI process are configured to aperiodically report the CSI, and if the first CSI process and the second CSI process are requested to be CSI reported at the same time, the second RI is set to the same value as that of the first RI corresponding to the second subframe set.

6. The method of claim 5, wherein the second PMI and second CQI of the second CSI process are set to the same values as those of the first CSI process, which are reported at the same time.

7. A method of reporting channel state information (CSI) in a wireless communication system, the method performed by a user equipment and comprising:
configuring a first CSI process in which subframe patterns for a first subframe set based on an almost blank subframe (ABS) and a second subframe set which is not based on the ABS are configured;
configuring a second CSI process in which the subframe patterns are not configured;
configuring a first rank indicator (RI) corresponding to the second subframe set to be the same as a second RI of the second CSI process when the first CSI process and the second CSI process are configured to have the same RI as each other; and
transmitting the CSI on the basis of at least one of the first CSI process and the second CSI process.

8. The method of claim 7, wherein, if the first CSI process and the second CSI process are configured to periodically report the CSI, the first RI is set to the same value as that of the second RI which is reported most recently before the first RI is reported.

9. The method of claim 8, wherein a first precoding matrix indicator (PMI) corresponding to the second subframe set is set to the same value as that of a second PMI which is reported most recently before the first PMI is reported.

10. The method of claim 8, wherein a first channel quality indicator (CQI) corresponding to the second subframe set is set to the same value as that of a second CQI which is reported most recently before the first CQI is reported.

11. The method of claim 7, wherein, if the first CSI process and the second CSI process are configured to aperiodically report the CSI, and if the first CSI process and the second CSI process are requested to be CSI reported at the same time, the first RI is set to the same value as that of the second RI of the second CSI process.

12. The method of claim 11, wherein the first PMI and the first CQI, which correspond to the second subframe set, are set to the same values as those of the second CSI process, which are reported at the same time.

13. A user equipment for reporting channel state information (CSI) in a wireless communication system, the user equipment comprising:
a radio frequency (RF) unit that transmits radio signals; and
a processor, connected with the RF unit, that:
configures a first CSI process in which subframe patterns for a first subframe set based on an almost blank subframe (ABS) and a second subframe set which is not based on the ABS are configured,
configures a second CSI process in which the subframe patterns are not configured,
configures a second rank indicator (RI) of the second CSI process to be the same as a first RI corresponding to the second subframe set when the second CSI process is configured to have the same RI as that of the first CSI process, and
controls the RF unit to transmit the CSI on the basis of at least one of the first CSI process and the second CSI process.

14. A user equipment for reporting channel state information (CSI) in a wireless communication system, the user equipment comprising:
a radio frequency (RF) unit that transmits radio signals; and
a processor, connected with the RF unit, that:
configures a first CSI process in which subframe patterns for a first subframe set based on an almost blank subframe (ABS) and a second subframe set which is not based on the ABS are configured,
configures a second CSI process in which the subframe patterns are not configured,
configures a first rank indicator (RI) corresponding to the second subframe set to be the same as a second RI of the second CSI process when the first CSI process and the second CSI process are configured to have the same RI as each other, and
controls the RF unit to transmit the CSI on the basis of at least one of the first CSI process and the second CSI process.

* * * * *